United States Patent [19]
Farnsworth

[11] 3,812,385
[45] May 21, 1974

[54] SOLID STATE TOTALIZER
[75] Inventor: Richard G. Farnsworth, York, Maine
[73] Assignee: General Electric Company
[22] Filed: June 23, 1972
[21] Appl. No.: 265,810

[52] U.S. Cl................. 307/243, 328/116, 307/246, 307/241, 328/104
[51] Int. Cl...................... H03k 17/00, H03k 17/02
[58] Field of Search .......... 307/246, 243, 315, 241; 328/104, 116

[56] References Cited
UNITED STATES PATENTS
3,305,176  2/1967  Brace................................ 307/315

Primary Examiner—Rudolph V. Rolinec
Assistant Examiner—B. P. Davis
Attorney, Agent, or Firm—Vale D. Myles; Francis X. Doyle; Volker R. Ulbrich

[57] ABSTRACT

A totalizer which acts as a summation relay to connect a number of measuring devices to a single recording end device. In the totalizer, an independent timing pulse source is employed to actuate individual input circuits connected to the various measuring devices. The totalizer is designed so that the pulse rate of the timing pulse source does not have to be changed each time a change is made in the number of measuring devices connected to the totalizer. In some embodiments of the totalizer provision is made for subtracting signals from selected measuring devices and for preventing loss of count under several circumstances, such as a momentary loss of power.

13 Claims, 10 Drawing Figures 3,812,385

SOLID STATE TOTALIZER

BACKGROUND OF THE INVENTION

Today, many quantities are measured by devices which generate pulses corresponding to units of measurement. For example, meters for measuring kilowatt-hours have been designed to generate an electric output pulse each time the meter indicates that some fixed quantity of power has been measured by the meter. In some instances, such as in the case of large power interchange stations that have a number of pulse generating kilowatt-hour meters, it is desirable to totalize the pulses from the meters and thereby obtain a single pulse count that represents total power leaving the station. For such applications, totalizers are required that can accept random input signals from a plurality of measuring devices and provide an output to a single counting and/or recording device which will count and/or record the total of the various inputs.

In the past, mechanical totalizers were used in various applications to provide a single output signal from a plurality of inputs. However, these mechanical devices suffer from a number of deficiencies such as the wearing of mechanical parts, inaccuracy of operation, need for periodic maintenance, and inherent low speed operating characteristics. As a result, efforts were made to develop electronic totalizers which would be devoid of the type of deficiencies common in mechanical totalizers.

One highly successful solid state totalizer is described in U. S. Pat. No. 3,489,924 issued to the present inventor and assigned to the assignee of the present invention. This totalizer was free to most of the above-mentioned types of difficulties found in the prior art mechanical totalizers. However, it was thought at the time the invention of U.S. Pat. No. 3,489,924 was developed that a separate timing source could not be used to trigger each input circuit without requiring a change in pulse rate each time the number of measuring devices connected to the totalizer was changed. Therefore, this prior art totalizer was designed to employ solid state input circuits for each measuring device and its input circuits are triggered by input pulses from each of the measuring devices.

As the use of totalizers grew, the demand for more sophisticated totalizers also increased. For example, in the course of normal operations, totalizer input pulses can be generated by measuring devices at precisely the same time that an input circuit is being triggered. Confronted with such a circumstance, prior art solid state totalizers could either lose the input pulse or fail to send a triggering signal to the next input circuit.

In addition, operating experience has established that totalizer input pulses from various measuring devices often are sufficiently different so that the unit of measurement, such as a kilowatt hour, might be presented as two different specific measurements to a totalizer. Hence, it is desirable to equalize the inputs from the measuring devices within the totalizer apparatus so that pulses delivered by the totalizer to an output device will accurately represent identical units of measurement. Prior art solid state totalizers do not readily provide for such equalization functions.

From the above, it is obvious that there is a present need for an improved solid state totalizer using a separate timing pulse source which will accept inputs from any number of measuring devices without requiring a change in the timing pulse rate. There is also a need for a totalizer which can readily equalize input pulses and for a totalizer which will not lose a count in the event an input pulse is generated at the precise moment the corresponding input circuit is being triggered.

SUMMARY OF THE INVENTION

It is therefore an object of the invention to provide a novel count totalizer utilizing solid state components.

Another object of the invention is to provide a solid state totalizer having a separate timing pulse source the pulse rate of which does not need to be changed each time a change is made in the number of pulse generating devices connected to the totalizer.

Another object of the invention is to provide a solid state totalizer which can readily equalize input signals.

A still further object of the invention is to provide a solid state totalizer which does not lose a count in the event an input pulse is received at precisely the same moment that an input circuit is being triggered.

A still further object of the invention is to provide a solid state totalizer employing a new pulse counter driving circuit.

Further objects and advantages of the invention will be apparent to those skilled in the art from the following description of it taken in conjunction with the attached drawings.

In one preferred form, the invention comprises a solid state totalizer having a plurality of input circuits each connected for accepting a random input signal from a corresponding signal generating device. Each input circuit comprises first and second storage devices which have a plurality of stable states. The solid state totalizer of the present invention also includes a clock for periodically generating first and second clocking pulses. Each first clocking pulse is fed simultaneously to all the input circuits. These clocking pulses cause each of the first storage devices to be set to a state corresponding to the respective input signal currently being received at each input circuit, provided the states of the first and second storage devices are in a first preselected relation which indicates that the first storage device is ready to receive an input signal. If the first storage device of any input circuit is not ready to receive an input signal, the first storage device of that input circuit remains in its former state.

Each input circuit further comprises a logic circuit. After each first clocking pulse has been applied simultaneously to all of the input circuits a second clocking pulse is sent to the logic circuit of a selected input circuit. The second clocking pulse acts as an inquiry signal to activate the logic circuit, which logic circuit compares the state of the first and second storage devices. If the storage devices are in the first preselected relation, which now indicates that the first device has not changed state as a result of an input signal, the logic circuit sends an inquiry signal to a succeeding input circuit, activating a logic circuit in that succeeding input circuit. An inquiry signal will continue to be sent to each successive input circuit from a preceding input circuit provided the storage devices in each preceding input circuit are in the first preselected relationship. However, once an activated logic circuit detects that the corresponding first and second storage devices are in a second preselected relation, which indicates that the first storage device has changed state as a result of an input signal, the logic circuit sends an output signal to an output switch. The output switch acts to control a counter or recorder which counts the total number of input signals received from all the signal generating devices over a selected period of time. The output signal is also used to change the state of the second storage device of the activated input circuit so that the first and second storage devices are returned to said first preselected relation, and thereby allow the first storage device of that input circuit to receive a new input signal upon generation of the next first clocking pulse. The output signal from an activated logic circuit is also used to signal a pulse counter driving circuit and thereby cause it to advance a pulse counter.

Embodiments of the invention, which are described in detail below, include; circuitry that provides protection from count loss in the event energizing power is momentarily lost, circuitry for equalizing signals from various input circuits so that more than one input signal is needed at some input circuits to generate an output signal to the output switch, and circuitry to allow subtraction of the output signals of some input circuits from the output signals of other input circuits.

BRIEF DESCRIPTION OF THE DRAWINGS

In the more detailed description of the invention presented below, reference will be made to the appended drawings, wherein.

DETAILED DESCRIPTION OF THE INVENTION

Figure 1:
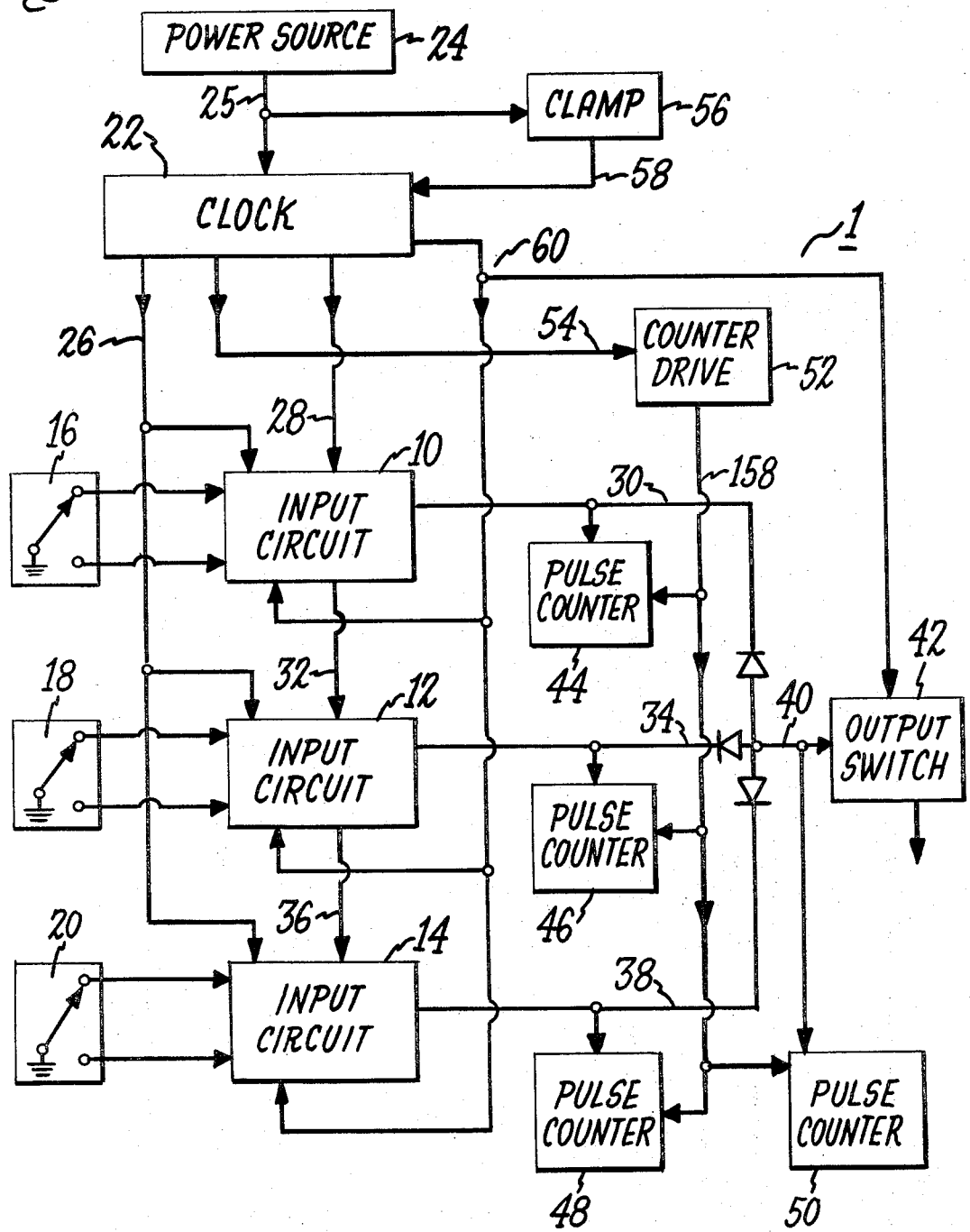
FIG. 1 is a block diagram of a preferred embodiment of the solid state totalizer of the invention.

FIG. 1 is a block diagram of one embodiment of the solid state totalizer 1 of my invention. In this embodiment, the totalizer 1 comprises a plurality of input circuits, three being shown in the drawings as input circuits 10, 12 and 14. Each input circuit in the totalizer is designed to receive random input signals from any of a variety of suitable types of signal generating devices, which signals may indicate a wide range of different types of measurable quantity, such as for example, some specific number of kilowatt-hours. To facilitate the description of the invention presented herein, it will be assumed that the input circuits are connected to receive signals from measuring devices that are designed to measure power consumption in kilowatt-hours. In the embodiment shown in FIG. 1, input circuits 10, 12 and 14 are connected to receive random input signals from respective remote signal generating devices 16, 18 and 20, which are each designated schematically as comprising, respectively, a single-pole double throw switch. It should be understood that generating devices 16, 18 and 20 could take the form of transducers that are connected to monitor electric watthour meters, which are connected to measure electric power consumption. The generating devices 16, 18 and 20 are operable to alternately connect one of two input terminals of each of the input circuits 10, 12 and 14 to a common ground thereby to indicate generation of an input signal. This arrangement requires only two wires, or other suitable conductors, plus the common ground to run between the signal generating devices 16, 18 and 20 and each input circuit 10, 12 and 14 as will be discussed in greater detail below.

FIG. 1 further illustrates a clock 22 powered by a power source 24. Clock 22 periodically generates first clocking pulses which are simultaneously communicated to input circuits 10, 12 and 14 over line 26. The first clocking pulses from clock 22 trigger each of the input circuits 10, 12 and 14 to store the respective random input signals currently being sent by generating devices 16, 18 and 20, provided the respective input circuits are ready to receive an input signal.

Clock 22 is also operable to generate a second clocking pulse to input circuit 10 over line 28 a preselected time after transmission of the first clocking pulse over line 26. The second clocking pulse acts as an interrogation, or inquiry, signal and causes an output signal to be generated over line 30 if input circuit 10 is in a relationship indicating the input circuit is storing an input signal. However, if input circuit 10 is not in such a relationship, an inquiry signal will be communicated from input circuit 10 to the next input circuit 12 over line 32. In response to the inquiry signal on line 32, input circuit 12 will either send an output signal over line 34, if circuit 12 is storing an input signal, or send an inquiry signal to the next successive input circuit 14 over line 36 if circuit 12 is not storing an input signal. In response to the inquiry signal from input circuit 12, input circuit 14 will send an output signal over line 38 if a condition indicating storage of an input signal. It is to be understood that any number of input circuits may be employed, three being used merely as an illustrative example.

Lines 30, 34 and 38 are all connected to line 40 which is connected to a suitable output means, such as an output switch 42. Output switch 42 is responsive to activation by signals from any of the input circuits 10, 12 and 14 to drive a suitable type of desired end recording and/or counting device (not shown) to record and/or count the total number of random input signals received by the totalizer. For optimum operation, it is suggested that clock 22 be programmed to generate the first clocking pulses at a rate commensurate with the maximum rate at which the recording and/or counting device can best receive information. It is also desirable which random signal generating devices (16, 18 and 20) be used which each have a signal generating rate considerably slower than the rate of generation of the first clocking pulses.

The embodiment of the invention disclosed in FIG. 1 also comprises a plurality of pulse counters, or recorders, 44, 46, 48 and 50 which are connected, respectively, to lines 30, 34, 38 and 40 for continuously monitoring each of the input circuits as well as monitoring the total number of output signals that are sent to output switch 42 from all of the input circuits. Each of the pulse counters 44, 46, 48 and 50 is powered by a counter drive 52, which counter drive 52 is controlled by a counter drive signal generated by a clock 22 and transmitted over line 54. The counter drive signal is generated a predetermined time after each first clocking pulse on line 26 but before each second clocking pulse on line 28.

The embodiment disclosed in FIG. 1 further discloses a clamp 56 for continuously monitoring the level of power supplied to the totalizer 1 over line 25 by power source 24. When the power source 24 falls below a level sufficient to run the totalizer, the clamp generates an OFF signal and sends it to clock 22 over line 58, which OFF signal stops the pulse generating operation of the clock. When power returns to a sufficiently high level on line 25, the clamp generates an ON signal and sends it to clock 22 over line 58. Upon receipt of the ON signal, clock 22 generates a reset signal on line 60, which signal both sets output switch 42 to the condition the switch was at before power loss and also resets all the input circuits 10, 12 and 14 to ready them for receipt of additional random input signals.

Figure 2:
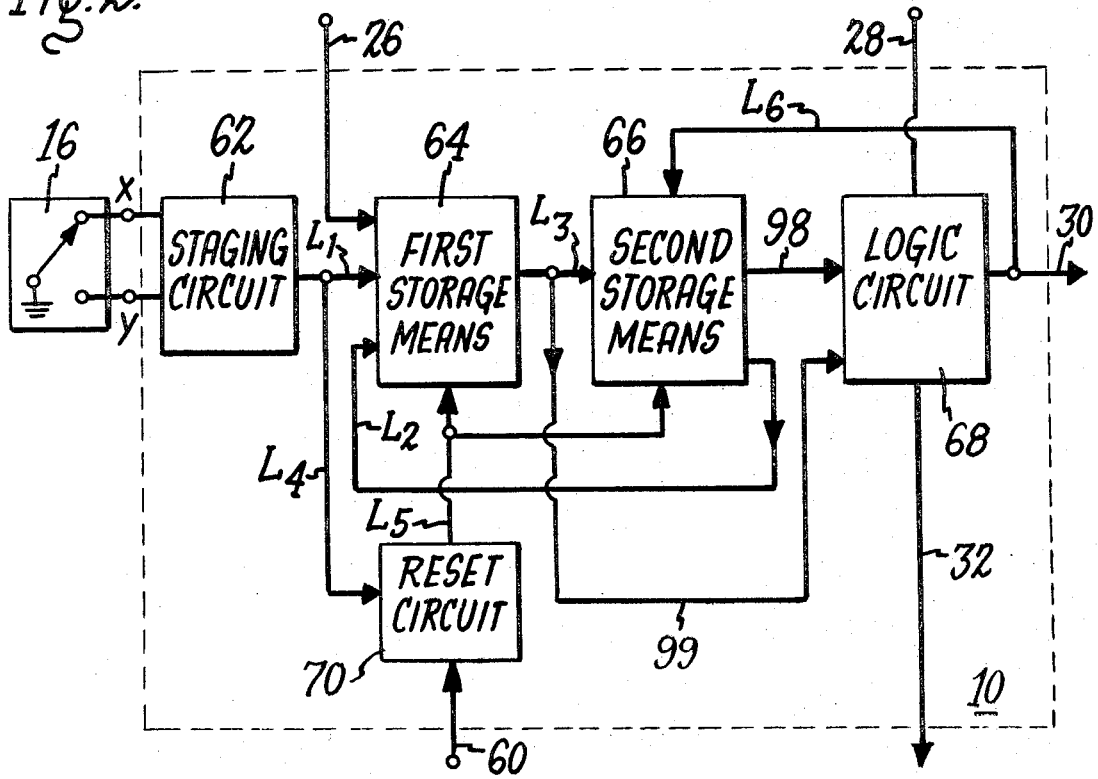
FIG. 2 is a block diagram of one of the input circuits of the totalizer illustrated in FIG. 1.

FIG. 2 is a block diagram of input circuit 10. Since all the input circuits used in the totalizer 1 are substantially identical in design, a description of it will serve to describe the circuitry and function of all the input circuits. Input circuit 10 comprises a staging circuit 62, a first storage means 64, a second storage means 66, a logic circuit 68, and a reset circuit 70.

Before describing the overall function of input circuit 10 further, a more detailed understanding of its staging circuit 62 may be desirable for receiving random input signals from signal generating device 16. First storage means 64 includes a means for receiving random input signals from staging circuit 62 over line $L_1$ and a means for receiving first clocking pulses over line 26. Line $L_2$ acts to communicate the state of a second storage means 66 to the first storage means 64, while line $L_3$ acts to communicate the state of first storage means 64 to the second storage means 66.

Figure 3:
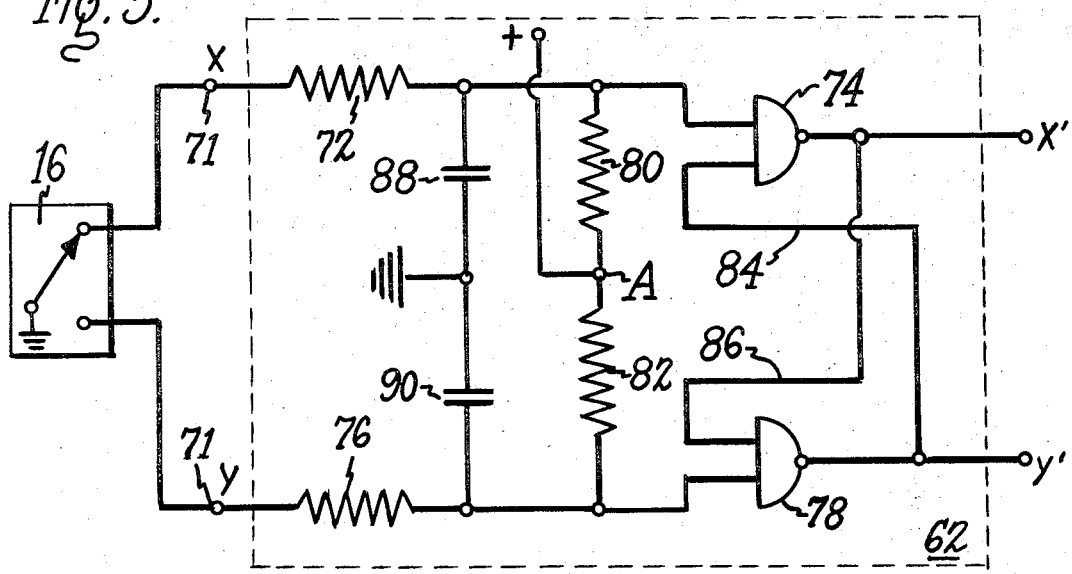
FIG. 3 is a block diagram of a staging circuit for the input circuit illustrated in FIG. 2.

Reference is now made to FIG. 3 for a more detailed description of one preferred embodiment of staging circuit 62. In this embodiment, a random input signal, represented by movement of a switch in generating device 16, is communicated over the two illustrated lines to a means 71 for receiving input signals. The means 71 includes a pair of terminals X and Y. Terminal X is connected by a resistor 72 to a first input of NAND gate 74, and terminal Y is connected by a resistor 76 to a first input of NAND gate 78. Resistors 80 and 82 are connected together at a point A and the resultant series is shunted across the first inputs of NAND gates 74 and 78. A positive potential is supplied at point A, as shown, so that when the switch of generating device 16 is moved from the pole connected to terminal Y to the pole connected to terminal X, the potential at the first input of NAND gate 74 drops from a high to a low value, and the potential at the first input of NAND gate 78 goes from a low to a high value. In a similar manner, when the switch of device 16 is disconnected from terminal X to terminal Y, the potential at the first input of NAND gate 78 drops from a high to a low value and the potential at the first input of NAND gate 74 goes from a low to a high value.

NAND gates 74 and 78 are of any suitable type well known in the art, and thus are designed to generate a high output signal when any input signal is low, and to generate a low output signal only if all input signals are high. Therefore, with line 84 connecting the output of NAND gate 78 to a second input of NAND gate 74, and line 86 connecting the output of NAND gate 74 to a second input of NAND gate 78, it may be seen that when the switch of generating device 16 is connected to terminal X, a high signal is generated at output terminal X' of NAND gate 74 and a low output signal is generated at output terminal Y' of NAND gate 78. Likewise, when the switch of generating device 16 is connected to terminal Y, a high output signal is generated at output terminal Y' and a low output signal is generated at output terminal X'. Random input signals may therefore be communicated from a signal generating device, such as device 16, to staging circuit 62 over only two lines to terminals X' and Y'. There must, of course, be a common or ground which is common to all input signal devices and also common to the ground of the totalizing device. Capacitors 88 and 90 are present to provide a source of current to the external signal generating device 16 to assure its proper operation even after an oxide film has built up on its contacts.

First and second storage means 64 and 66 of input circuit 10, see FIG. 2, may comprise any suitable known logic networks which have a plurality of stable states and are capable of assuming a particular stable state corresponding to a particular input signal responsive to being triggered by a first clocking pulse. When the signal generating devices employed in conjunction with the totalizer of the present invention generate binary signals, as illustrated by the switch of generating device 16, first and second storage means 64 and 66 may each comprise a bistable multivibrator or flip-flop, as is well known. One such suitable flip-flop is a type currently designated Type 945 and graphically depicted in FIG. 4. In the preferred embodiment of the invention, the same type flip-flop used as first storage means 64 is also used as second storage means 66.

Figures 4, 5:
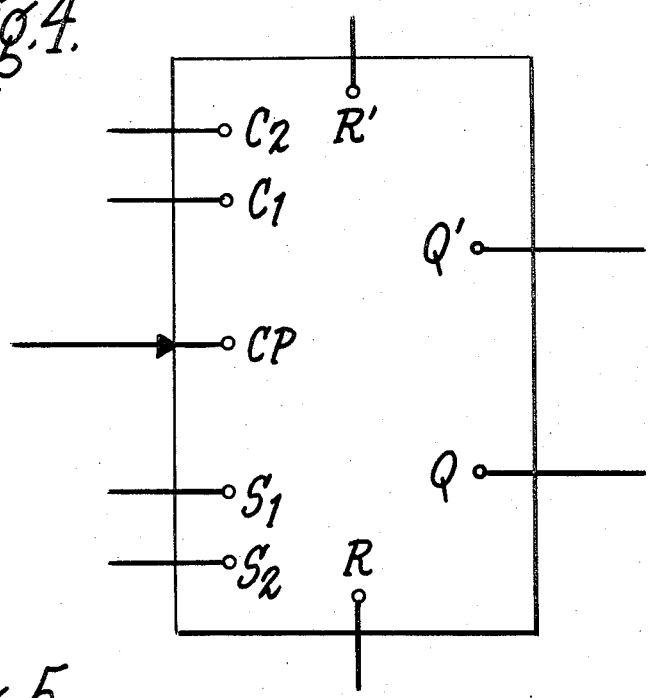
FIG. 4 is a block diagram of a flip-flop used in the circuitry of the storage means illustrated in the diagram of FIG. 2.
FIG. 5 is a truth table of the flip-flop shown in FIG. 4.

The flip-flop in FIG. 4 comprises a clocking pulse terminal CP, a primary output Q, a secondary output Q', a primary reset terminal R, a secondary reset terminal R', and logic terminals C1, C2, S1 and S2. A truth table for the flip-flop of FIG. 4 is given in FIG. 5. The truth table is read by considering a time $T_n$ which occurs before a clocking pulse is generated at terminal CP. The designation 0 indicates a low value and the designation 1 indicates a high value while the designation X indicates that either a high or low value is present at a respective terminal. The time $T_n$ is the time immediately before a clocking pulse and the time $T_{n+1}$ indicates the time immediately after the receipt of a clocking pulse at terminal CP. The designation $Q_n$ indicates that the value at output terminal Q is the same at time $T_{n+1}$ as it was before the clocking pulse at time $T_n$. It should also be noted that when a low input is applied to reset terminal R, output terminal Q is set to a high logic value, and when a low input signal is provided at reset terminal R', output terminal Q' is set to a high logic value. At all times the value at output terminal Q complements the value at output terminal Q'.

Figure 6:
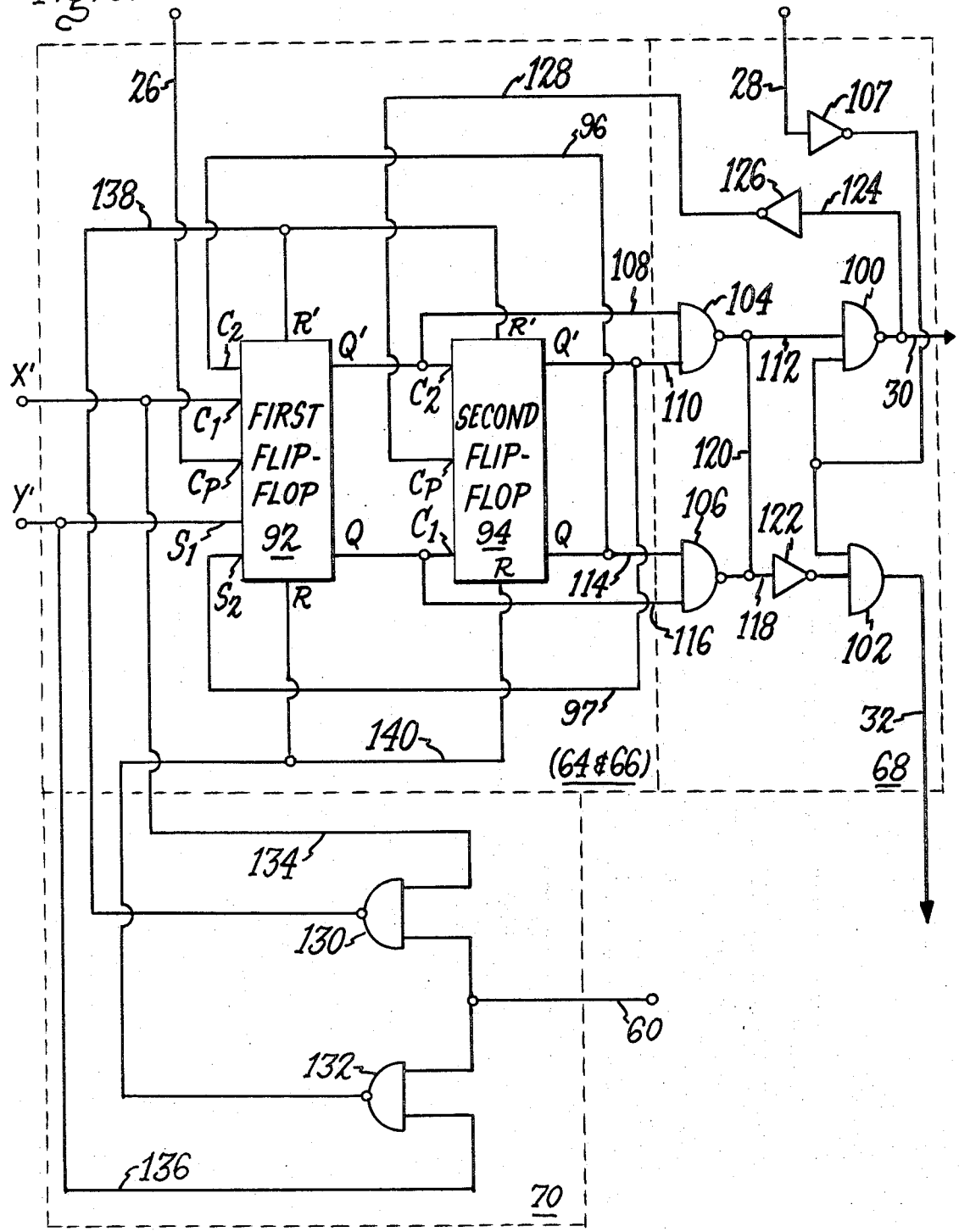
FIG. 6 is a circuit diagram of the first storage means, the second storage means, the logic circuit and the reset circuit shown in the block diagram of FIG. 2.

As shown in FIG. 6, when a flip-flop 92, such as the one described above, is employed as first means for storing (to perform the function of first storage means 64, shown in FIG. 2), it may be connected to staging circuit 62 by coupling output terminals X' and Y' of staging circuit 62, respectively, to terminals C1 and S1 of flip-flop 92. Line 26 which carries the first clocking pulses from clock 22 is connected to clocking pulse terminal CP of flip-flop 92. In order to prevent the output state of flip-flop 92 from changing upon receipt of a first clocking pulse before flip-flop 92 is ready to receive a new input signal from staging circuit 62, terminal Q of flip-flop 94 (used in this embodiment as a second means for storing, equivalent in function to the second storage means 66 shown in FIG. 2) is connected by line 96 to terminal C2 of flip-flop 92, and terminal Q' of flip-flop 94 is connected by line 94 to terminal S2 of flip-flop 92. Thus, flip-flop 92 cannot change the state of its terminals Q and Q' if flip-flops 92 and 94 do not have both Q terminals in the same state and both Q' terminals in the same state. Even if flip-flops 92 and 94 are in the same state, flip-flop 92 will not change state upon receipt of a first clocking pulse at CP unless the signals at X' and Y' are different respectively from the signals at Q' and Q of flip-flop 92.

Note should also be taken that once flip-flop 92 is triggered into a stable state by a first clocking pulse, signals at terminals X' and Y' of staging circuit 62 will have no effect on flip-flop 92 until the next first clocking pulse is received at terminal CP. Therefore, if the signals at terminals X' and Y' change precisely at the time a first clocking pulse is applied to clocking terminal CP of the flip-flop 92 the change may or may not be recorded by flip-flop 92. However, if the change is not recorded, and it should have been, then upon the application of the next first clocking pulse, the change will be recorded in flip-flop 92. Thus, the procedure can be assured of preventing count loss if the rate of the first clocking pulses is set sufficiently higher than the expected rate of receipt of random input pulses from any one signal generating device.

In FIG. 2 logic circuit 68 is connected to receive second clocking pulses from clock 22 over line 28. Logic circuit 68 also has an input 98 for receiving the output of second storage means 66 and an input 99 for receiving the output of first storage means 64. Upon receipt of a second clocking pulse on line 28, logic circuit 68 generates an inquiry signal over line 32 to the next input circuit 12 if first and second storage means 64 and 66 are in a first preselected relation. Alternatively, logic circuit 68 operates to generate an output signal over line 30 to output switch 42 if the first and second storage means 64 and 66 are in a second preselected relation to one another.

Reference is made to FIG. 6 for a more detailed description of one suitable embodiment of logic circuit 68. It is to be understood, however, that any suitable combination of elements may be employed for logic circuit 68 provided they perform the functions generally described above. In FIG. 6, logic circuit 68 comprises NAND gates 100, 102, 104 and 106. Line 28 communicates a low second clocking pulse from clock 22 to an inverter 107. The output of inverter 107 is connected to first input terminals of both NAND gates 100 and 102. NAND gate 104 compares the value at output terminals Q' of first and second flip-flops 92 and 94 over respective lines 108 and 110 and communicates a high output signal over line 112 to a second input of NAND gate 100 if either Q' terminal is in a low state. In a similar manner, NAND gate 106 compares the Q terminals of both flip-flops 92 and 94 over respective lines 114 and 116 and generates a high output signal over line 118 if either terminal Q of flip-flop 92 or 94 is in a low state. Line 118 is connected to line 112 by line 120 and line 118 is also connected to an input of inverter on 122. The output of inverter 122 is connected directly to a second input of NAND gate 102.

Therefore, if flip-flops 92 and 94 are in opposite states, that is one flip-flop is high at terminal Q and a low at Q' while the other flip-flop is high at Q' and low at Q, then a high output signal will be generated by both NAND gates 104 and 106 and communicated to NAND gate 100 over line 112. If a low second clocking pulse is then received over line 28 and inverted to a high input signal for NAND gate 100, the output of NAND gate 100 will go to a low value and thereby generate a low output signal over line 30 to output switch 42. At the same time, the low output signal from NAND gate 100 is communicated over line 124 to inverter 126 where the low signal is converted to a high signal on line 128 and communicated to clocking terminal CP at flip-flop 94. The high signal at terminal CP of flip-flop 94 will reverse the states of output terminals Q and Q' to set flip-flop 94 in the same state as flip-flop 92.

When a low second clocking pulse is received over line 28, and flip-flops 92 and 9$ are in opposite states as described above, NAND gate 102 receives a low input signal from inverter 122. Therefore, the output signal from NAND gate 102 over line 32 remains at a high value upon receipt of the second clocking pulse.

If first and second flip-flops 92 and 94 are in the same logic state, either NAND gate 104 or 106 will receive two high input signals at its respective input terminals, thereby generating a low input signal over line 112. Since a low output signal is dominant over a high output signal, a low output signal is generated to NAND gate 100 to hold NAND gate 100 at a high output upon receipt of a second clocking pulse from inverter 107. The dominating low output signal from either NAND gate 104 or 106 is also communicated over line 118 to inverter 122 where the low signal is converted to a high output signal and delivered to NAND gate 102. When a low second clocking pulse is received over line 28 and a resulting high signal is communicated from inverter 107 to NAND gate 102, NAND gate 102 goes from a high output to a low output. The low output from NAND gate 102 is communicated by line 32 to the next input circuit 12 as an inquiry signal.

In FIG. 2 reset circuit 70 is connected to receive a reset signal over line 60 from clock 22 (also see FIG. 1) initially at start-up and also upon a loss of power from supply 24. Reset circuit 70 receives random input signals from staging circuit 62 over line $L_4$ and communicates reset signals over line $L_5$ to first and second storage means, 64 and 66.

A more detailed diagram of one suitable embodiment of a reset circuit 70 is shown in FIG. 6. In this embodiment, reset circuit 70 comprises two NAND gates 130 and 132 each of which has a first input terminal connected to line 60 for receiving the reset signals from clock 22. A second input terminal of NAND gate 130 is connected by line 134 to terminal X' of staging circuit 62. A second input terminal of NAND gate 132 is connected by line 136 to terminal Y' of staging circuit 62. When terminal X' is at a high level and the reset pulse on line 60 is at a high level, a low level signal is communicated over line 138 to reset terminals R' of flip-flops 92 and 94 thereby setting output terminals Q' of flip-flops 92 and 94 to a high state. In a similar manner, when terminal Y' of staging circuit 62 is at a high value and a high value reset pulse is received on line 60, a low value signal is transmitted over line 140 to reset terminals R of flip-flops 92 and 94 setting output terminals Q of flip-flops 92 and 94 to a high value. Hence, upon generation of a reset pulse, flip-flops 92 and 94 are both set to a state dependent on the input signal currently being received.

Figure 7:
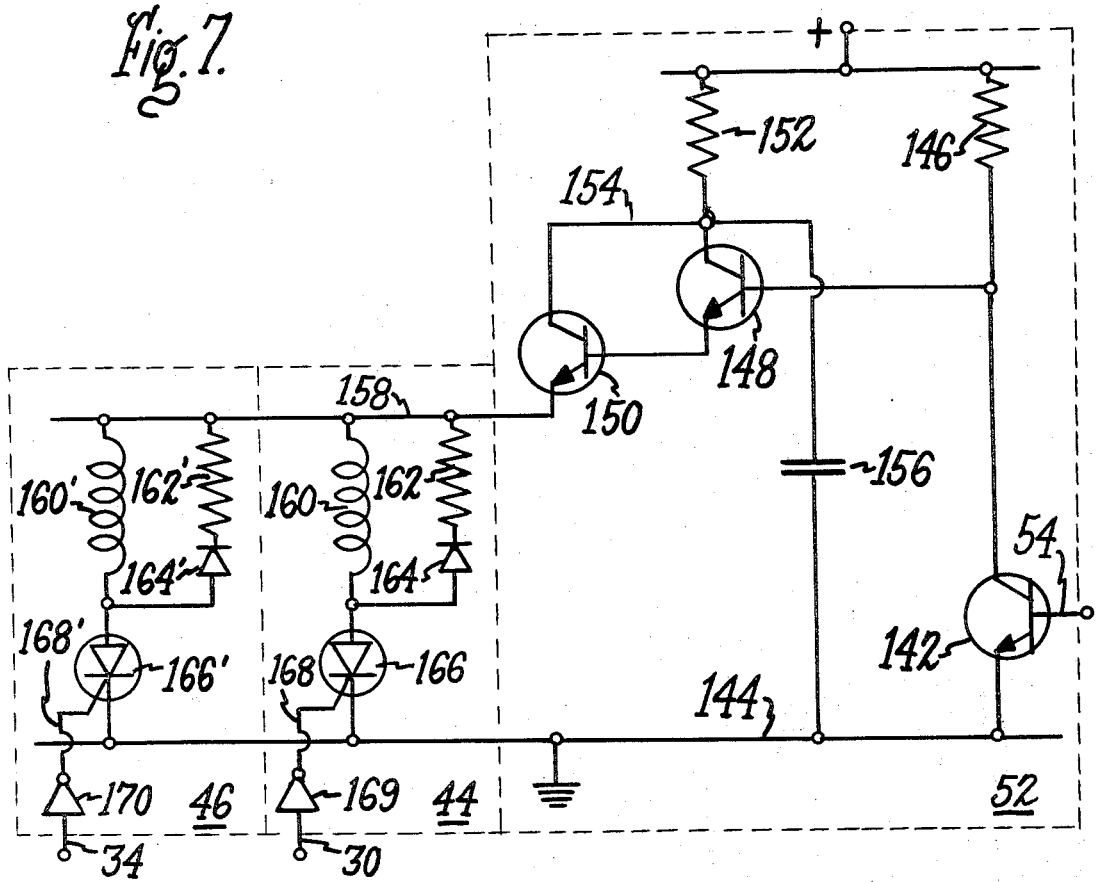
FIG. 7 is a circuit diagram of the counter drive and the pulse counters of the invention shown in the block diagram of FIG. 1.

A detailed diagram of one suitable form of the counter drive 52, disclosed in FIG. 1 for driving pulse counters 44, 46, 48 and 50 is shown in greater detail in FIG. 7 of the drawing. In this embodiment, counter drive 52 employs a transistor 142 having a base connected to input line 54 for receiving a control drive signal from clock 22. The emitter of transistor 142 is connected to a common or ground line 144 and the collector of transistor 142 is connected through resistor 146 to a source of positive potential. Counter drive 52 also comprises a Darlington circuit utilizing a pair of transistors 148 and 150. Transistor 148 has a base connected to the collector of transistor 142, an emitter connected to the base of transistor 150, and a collector connected through a resistor 152 to the positive potential. The collector of transistor 148 and the collector of transistor 150 are tied together by line 154. Capacitor 156 is connected between common line 144 and the collectors of transistors 148 and 150. The value of resistors 152 and 146 are chosen such that when no control drive signal is received on line 54, transistor 142, which is in a normally on condition, will hold transistors 148 and 150 in an off condition. However, when a control drive signal is received from clock 22 over line 54, transistor 142 turns off, causing transistors 148 and 150 to turn on in preparation for driving any pulse counter which may subsequently be gated on.

The embodiment of the invention disclosed in FIG. 1 comprises a plurality of pulse counters 44, 46, 48 and 50. Two of these counters 44 and 46 are shown in detail with their associated circuits in FIG. 7 although it is to be understood that all the pulse counters employed in the present invention may be substantially identical to pulse counters 44 and 46 or of another design capable of performing equivalent functions. Pulse counters 44 and 46 comprise inductive windings 160 and 160', each connected in parallel with a respective series combination of a resistor 162 and 162' and a diode 164 and 164'. The resultant parallel combinations are connected to line 158 from counter drive 52 so that diodes 164 and 164' are reverse biased. The free ends of the parallel combinations are connected to anodes of corresponding control rectifiers 166 and 166'. The cathodes of the control rectifiers 166 and 166' are connected to common or ground 144. It may therefore be seen, that when a control pulse or drive signal is received over line 54 and a current is therefore generated over line 158, a current will be caused to flow through the coils 160 and 160' whose corresponding control rectifiers 166 and 166' are turned on by a gating signal at the control rectifier gates 168 and 168'. The currents in coils 160 and 160' may then be used to activate a suitable counter indicator, which is not shown.

To provide the control signal to the respective pulse counters, gate 168 of counter 44 is connected through an inverter 169 to receive a low going output signal from input circuit 10 (FIG. 1) over line 30, while gate 168' of pulse counter 46 is connected through inverter 170 to receive a low going output signal of input circuit 12 appearing on line 34. In a similar manner, pulse counters 48 and 50 may be connected to lines 38 and 40 as shown in FIG. 1.

Figure 8:
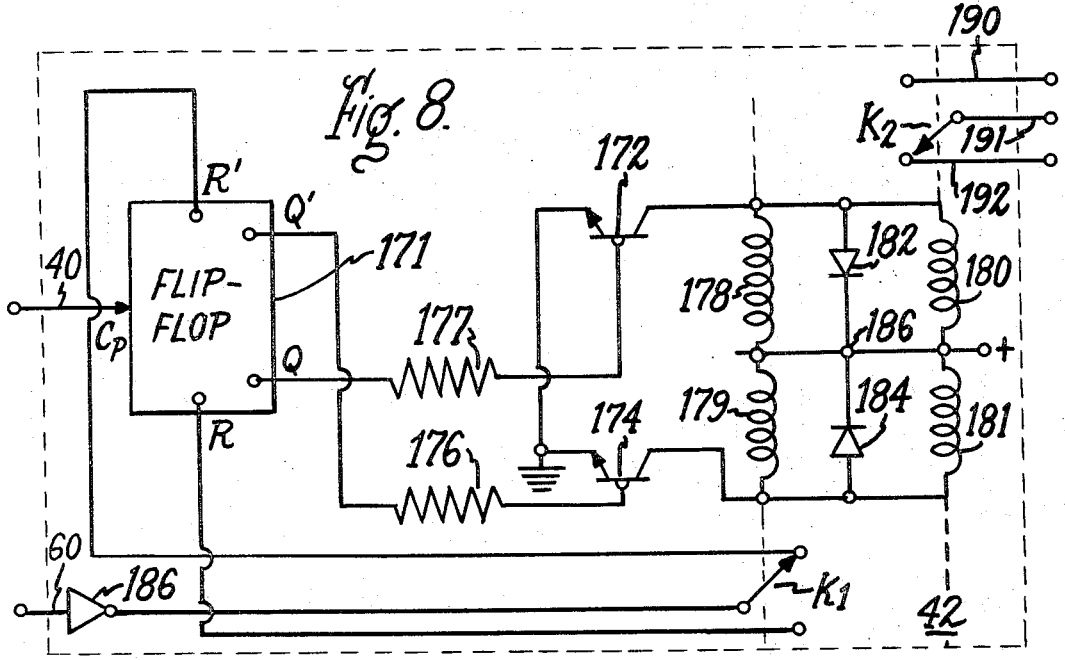
FIG. 8 is a circuit diagram of the output switch shown in the block diagram of FIG. 1.

One embodiment of output switch 42 shown in FIG. 1 is disclosed in greater detail in FIG. 8 of the drawing. In this embodiment, output switch 42 comprises a flip-flop 171, transistors 172 and 174, and relay switches K1 and K2. Line 40, which connects together the outputs from input circuits 10, 12 and 14 is connected to clocking pulse terminal CP of flip-flop 170. Output terminal Q' of flip-flop 171 is connected through resistor 176 to the base of transistor 174. Output terminal Q of flip-flop 171 is connected through resistor 177 to the base of transistor 172. The emitters of both transistors 172 and 174 are connected together to a common or ground point. Relay coils 178 and 179 of relay K1 are connected together in series between the collectors of transistors 172 and 174. Relay coils 180 and 181 of relay K2 are also connected together in series between collectors of transistors 172 and 174. The anodes of diodes 182 and 184 are connected to respective collectors of transistors 172 and 174 while the cathodes are connected together by a line 186 which also ties one end of relay coils 178, 179, 180 and 181 together at a common point. Both relays K1 and K2 are understood to be of a type commonly known as bistable which means that the contacts will remain after the removal of power to the coil, in either of their two stable states.

A positive potential is supplied to line 186 such that when the output terminal Q of flip-flop 171 is at a high state causing transistor 172 to conduct, current flows through relay coils 178 and 180 causing relays K1 and K2 to assume a first position. When an output signal is received over line 40 causing terminal Q of flip-flop 171 to assume a low value and terminal Q' to assume a high value, transistor 172 turns off and transistor 174 turns on so current flows through relay coils 179 and 181 causing relays K1 and K2 to both assume a second stable position.

Line 60 which carries reset pulses from clock 22 is connected through an inverter 186 to a movable contact arm of relay K1. In a first position, the movable arm of K1 connects line 60 to reset terminal R while in a second position (as shown in FIG. 8) the arm of relay K1 connects line 60 to reset terminal R' of flip-flop 171. It may therefore be seen that if upon power loss, a high signal reset pulse is transmitted over line 60, a low signal pulse will be connected to the appropriate reset terminal R or R' of flip-flop 171 depending upon the particular position in which the arm of relay K1 was set prior to power loss.

The output lines 190, 191 and 192, shown connected to relay K2 in FIG. 8, are connected to a suitable recording and/or counting device that is not shown herein.

Although it is believed the foregoing description of the invention is sufficient to enable those skilled in the art to understand its operation, the operation will now be described generally with particular reference to FIGS. 1 and 2. In operation, upon application of power from source 24, a reset pulse is generated by clock 22 over line 60 to all input circuits 10, 12 and 14. EAch reset circuit 70 in each of the input circuits, when activated by a reset pulse, generates reset signals over line $L_5$ to first and second storage means 64 and 66 to set these storage means in the same state corresponding to the random input signal currently being received by the reset circuit over line $L_4$ from staging circuit 62.

For example, referring to input circuit 10, shown in FIG. 2, the position of the movable switch of generating device 16 determines the state of the signal at output terminals X' and Y' of staging circuit 62 in the manner described above with reference to FIG. 3. As explained above, if generating device 16 connects input terminal X to ground, then a high signal will appear at terminal X' and a low signal will appear at terminal Y' and if generating device 16 connects input terminal Y to ground, then a high signal will appear at terminal Y' and a low signal will appear at terminal X'.

Turning to FIG. 6, if, for example, a high signal exits at terminal X', the high signal will be communicated over line 134 to an input of NAND gate 130. A high signal reset pulse from clock 22 is also communicated to an input of NAND gate 130 over line 60. Hence, NAND gate 130 will generate a low signal over line 138 to reset terminals R' of flip-flops 92 and 94, thus setting terminals Q' of both flip-flops to a high state. In a similar manner if a high signal instead occurred at terminal Y', both Q terminals of flip-flops 92 and 94 would be set to a high state. Therefore, upon the first application of power, all the first and second means for storing in all the input circuits of the totalizer 1 are set in response to the reset signal on line 60 to a state corresponding to the particular random signal currently being received. The condition of having the first and second means for storing in the same state is a first preselected relation which indicates that the input circuits are ready to receive random input signals from corresponding signal generating devices.

After the reset pulse, clock 22 operates to periodically generate first clocking pulses over line 26 to each input circuit. Referring to FIG. 2, each first clocking pulse over line 26 will cause the first storage means 64 to achieve a stable state corresponding to the random signal being received over line $L_1$, provided the state of second storage means 66, as communicated by line $L_2$, and the state of first storage means 64 are in the aforesaid first preselected relationship.

Referring again to FIG. 6 for more detail, the first clocking pulses are connected to clocking terminal CP of first flip-flop 92. If generating device 16 is still connecting terminal X of staging circuit 62 to ground as it was in the above illustrative example, during reset, indicating that no random signal has been generated since reset, flip-flop 92 will simply retain its same state in response to the first clocking pulse on line 26. However, if during the interval between reset and the occurrence of a first clocking pulse from clock 22, the switch of generating device 16 had moved to terminal Y, indicating the occurrence of a random signal, terminal Q of flip-flop 92 would switch from a previous low to a high state and terminal Q' would switch from a previous high to a low state. This switch would therefore put first flip-flop 92 in a state different from the state of flip-flop 94. The switch can only occur, however, when flip-flops 92 and 94 were previously in the first preselected relationship because of the connection effected by lines 96 and 97, which was explained above.

The first clocking pulse from clock 22 over line 26 is communicated simultaneously to all input circuits and all input circuits react in a similar manner to store a random signal from random signal generators indicated by the switches of devices 16, 18 and 20. If such a switch has changed positions, illustrating the occurrence of a random signal, and if the first and second flip-flops of each input circuit were in the first preselected relationship when a first clocking pulse was received, then the state of the first flip-flop is reversed to establish a second preselected relationship, or condition indicating that a random signal is being stored.

Again referring to FIG. 2, a preselected time after the occurrence of the first clocking pulse on line 26, a second clocking pulse is generated on line 28 and communicated to a logic circuit 68 in input circuit 10. Logic circuit 68 includes means for generating an inquiry signal over line 32 in the event the state of the first storage means, communicated over line 99, and the state of the second storage means, communicated over line 98, are in the first preselected relationship indicating that no random signal is currently being stored. Logic circuit 68 also includes means for generating an output signal over line 30 when the states of the first and second storage means 64 and 66 are in a second preselected relationship indicating that a random signal is currently being stored. The outputs signal is also communicated over line $L_6$ back to the second storage means 66 wherein means responsive to the output signal cause the states of the first and second storage means 64 and 66 to assume the first preselected relationship by changing the state of the second storage means 66.

As described in detail above with reference to FIG. 6, a low signal second clocking pulse on line 28 is first inverted by inverter 107 from a low pulse to a high pulse, and then applied to a first input of both NAND gates 100 and 102.

As discussed above in detail, NAND gates 104 and 106 of logic circuit 68 act to interrogate the relative states of first and second flip-flops 92 and 94. NAND gates 104 and 106 generate a positive signal over line 112 if flip-flops 92 and 94 are in different states indicating that a random input signal is being stored in flip-flop 92. The occurrence of a positive signal on line 112, simultaneous with a high input at the first input terminal of NAND gate 100, causes a low output signal to be generated over line 30 and line 40 to output switch 42. The low signal from NAND gate 100 is also inverted to a high signal by inverter 126 and communicated over line 128 to clocking pulse input CP of flip-flop 94. This high pulse turns second flip-flop 94 again to the same state as flip-flop 92 and thereby re-establishes the first preselected condition whereby flip-flop 92 is ready to receive another random input signal upon the occurrence of a subsequent first clocking pulse on line 26.

As mentioned above, the output signal from NAND gate 100 is communicated by line 30 and line 40 to the input of output switch 42. Referring to FIG. 8, it may be seen that this output signal is communicated by line 40 to clocking terminal CP of flip-flop 171. The occurrence of a signal on line 40 causes flip-flop 171 to switch its output state as discussed above in detail. For example, if terminal Q' of flip-flop 171 were initially in a positive state, transistor 174 would be conducting and relays K1 and K2 would therefore be in a first stable state. Upon occurrence of a clocking pulse at terminal 40, the value of Q' would go from a high to a low state and the output at Q would go from a low to a high state turning on transistor 172 and causing relays K1 and K2 to assume a second stable state. A suitable counting and/or recording device is connected to lines 190, 191 and 192 of relay K2 to record or count the changing states of relay K2.

In the event the switch of generating device 16 of input circuit 10 had not changed state between reset and the first clocking pulse, indicating that no random signal had been sent, flip-flops 92 and 94 (FIG. 6) would still be in the first preselected relationship. As discussed above, a low signal is therefore generated over line 112 to the second input of NAND gate 100 and no low output signal is generated over line 30 upon receipt of a second clocking pulse over line 28. However, a second clocking pulse does cause a high signal to be applied to the first terminal of NAND gate 102, and with flip-flops 92 and 94 in the same states, a high signal is also applied to the second terminal of NAND gate 102. The result is that a low inquiry signal is generated over line 32 to the next input circuit 12. The inquiry signal online 32 to input circuit 12 acts in the same manner as the second clocking pulse acted on input circuit 10.

Therefore, if input circuit 12 is storing a random input signal, an output signal will be generated over line 34 to output switch 42 and cause relays K1 and K2 to change state. If, however, first and second flip-flops of input circuit 12 are also in the same state indicating that a random input pulse is not being stored in the first flip-flop of input circuit 12, an inquiry signal is generated over line 36 to input circuit 14. This process is continued for any number of input circuits with a continuous cycle of first and second clocking pulses.

After each first clocking pulse on line 26, but before the next second clocking pulse on line 28, clock 22 generates a control drive signal over line 54 to counter drive 52 (FIGS. 1 and 7) which is then prepared to cause current to flow to pulse counters 44, 46 or 48 over line 158, as described above. Pulse counters 44, 46, 48 and 50 are activated by output signals over respective lines 30, 34, 38 and 40 in the manner explained above.

Should power from power source 24 suddenly fail, clamp 56 generates an OFF signal to clock 22. The OFF signal causes clock 22 to cease generating first and second clocking pulses. Upon return of power, clamp 56 generates an ON signal to clock 22 over line 58. The ON signal causes clock 22 to generate a reset pulse over line 60. The reset pulse sets all the input circuits as described above. The reset pulse is also communicated over line 60 to output switch 42 (FIGS. 1 and 8). Dependent on the position of relay K1 before the power loss, the reset pulse will be sent through relay K1, either to terminal R or R' of flip-flop 171. Since the position of relay K1 is determined by the output state of flip-flop 171 before the power failure, as described above, the reset pulse is now assured of setting flip-flop 171 in its last position. Therefore, if the loss of power were only momentary, no count would be lost.

The embodiment of the present invention disclosed in FIG. 1 is limited in operation to the adding or totalizing of input signals or pulses from a plurality of random signal generating devices. The embodiment disclosed provides a single output signal at output switch 42 for each input signal generated by random signal generating devices 16, 18 and 20. In some operations requiring the use of totalizers, it is desirable to provide a means for equalizing input signals received at one input circuit with respect to input signals received at other input circuits. For example, if the input signals generated by device 20 and received at input circuit 14 each represent 10 kilowatt-hours, whereas the signals generated by devices 16 and 18 and received at input circuits 10 and 12 each represent 1 kilowatt-hour, each output signal on line 38 from input circuit 14 would be the equivalent of 10 output signals received on either line 30 or 34 from input circuit 10 or 12. Hence, it is desirable to provide some means at the output of input circuits 10 and 12 for delivering a single output signal to switch 42 for each ten output signals generated by input circuit 10 or 12.

Figure 9:
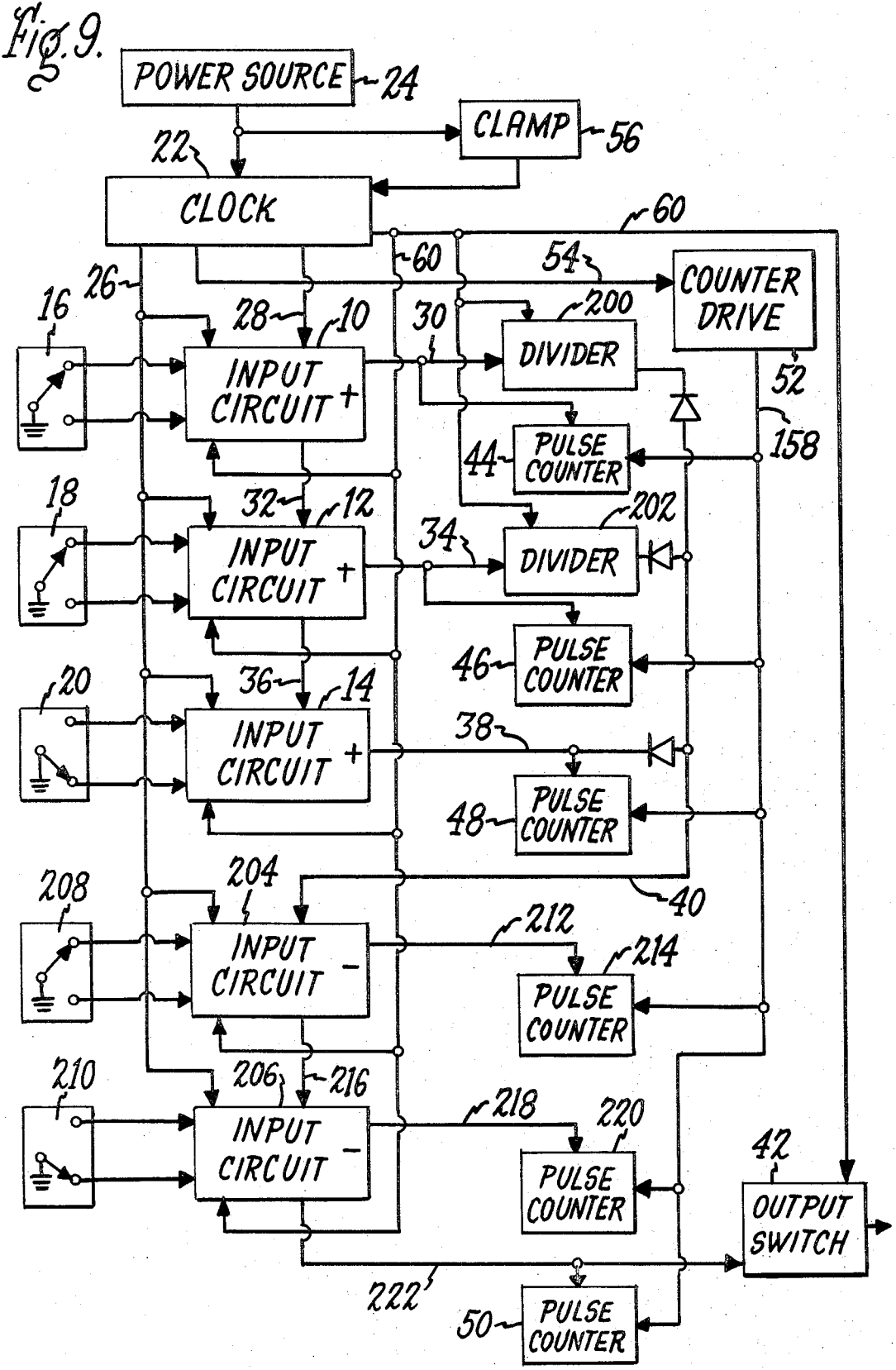
FIGS. 9 and 10 are block diagrams of additional embodiments of the solid state totalizer of the invention disclosed herein.

FIG. 9 of the drawing illustrates, among other things, how the totalizer of the present invention is readily adaptable to equalize the random signals from various signal generating devices in the manner suggested by the preceding paragraph. In FIG. 9, components substantially identical to components in FIG. 1 are indicated by the same reference numerals as in FIG. 1. For example, input circuits 10, 12 and 14; clock 22; power source 24; output switch 42; and clamp 56 are all connected in substantially the same manner as similar numbered components in FIG. 1. A primary difference between the embodiment of the invention shown in FIG. 9 and that shown in FIG. 1 is the connection of a means for dividing, which in this embodiment constitutes dividers 200 and 202, to the outputs of respective input circuits 10 and 12. Thus, as will be more fully appreciated from the following explanation, the dividers 200 and 202 and lines 40 and 38 can be regarded as first output means that are connected to receive first output signals from the first input circuits 10, 12 and 14.

Dividers 200 and 202, as is known to those skilled in the art, may comprise, for example, a plurality of flip-flops interconnected such that a given number of pulses are required at the input of the divider to generate a single output pulse. To equalize the outputs of input circuits 10 and 14 in the example given above, the divider 200 may, for example, comprise a 10 to one ratio wherein for every ten pulses from input circuit 10 a single output pulse will be delivered over line 40, whereas each single output pulse from input circuit 14 over line 38 will provide a corresponding single output signal over line 40. In this manner, it may readily be seen that the present solid state totalizer is easily adaptable to equalize input signals from random signal generating sources using dividers well known to those skilled in the electronics art.

Dividers 200 and 202 are also connected to receive reset pulses from clock 22 over line 60 so that they may be set to their zero state at start-up.

The embodiment in FIG. 9 discloses another feature of the present invention in that a second plurality of input circuits is provided. In this embodiment of the invention, this second plurality of input circuits takes the form of additional input circuits 204 and 206 which are employed to subtract random input signals from random signal generating devices 208 and 210. Each of the second plurality of input circuits 204 and 206 may be substantially identical to input circuit 10 described in detail above. Each input circuit 204 and 206 has a respective means for receiving input signals from devices 208 and 210, respectively. In addition, each input circuit 204 and 206 is connected to receive first clocking pulses from clock 22 over line 26, and to receive reset pulses from clock 22 over line 60.

Line 40 in FIG. 9, which carries output signals from input circuits 10, 12 and 14 is not connected directly to output switch 42 (as is the line 40 shown in FIG. 1), but rather is connected to provide an inquiry signal to a second selected input circuit of the second plurality of input circuits; namely to the logic circuit of input circuit 204. Output signals from input circuit 204 are communicated by line 212 to a pulse counter 214. When input circuit 204 is not in a condition to generate an output signal over line 212 to pulse counter 214 upon application of an inquiry signal over line 40, an inquiry signal is generated from input circuit 204 over line 216 to the logic circuit of input circuit 206. Output signals from input circuit 206 are generated over line 218 to another pulse counter 220. When input circuit 206 is not in a condition to generate output signals over line 218 upon receipt of an inquiry signal over line 216, an inquiry signal from input circuit 206 is generated over line 222 to output switch 42.

In operation of the embodiment of the invention disclosed in FIG. 9, after a reset pulse is generated over line 60 to initially set input circuits 10, 12, 14, 204 and 206, as is discussed in detail with respect to FIG. 1, a first clocking pulse is generated over line 26 from clock 22. The first clocking pulse over line 26 operates to set first means for storing in each of the input circuits corresponding to any changes in the respective random signal generating devices designated by the switches or movable arms of devices 16, 18, 20, 208 and 210. A pre-selected time after each first clocking pulse, a second clocking pulse is generated from clock 22 over line 28 to input circuit 10. As discussed above, if the first and second means for storing (92 and 94) in input circuit 10 are in the first pre-selected relation indicating that a random input signal is not being stored in the first means for storing, then an inquiry is generated over line 32 to succeeding input circuit 12. If the first and second means for storing in input circuit 12 are also in the first preselected relation, an inquiry signal is generated to input circuit 14 over line 36. If the first and second means for storing in input circuit 14 are also in the first preselected relationship indicating that no random signal is currently being stored, no inquiry is generated and the totalizer remains substantially inactive until generation of the next first clocking pulse from clock 22.

However, the first input circuit (10, 12 or 14) which has its first and second means for storing in the second preselected relation, thereby indicating that a random signal is currently being stored, will generate an output signal instead of generating an inquiry signal. For example, if the input circuit 12 is the first to have its first and second means for storing in the second preselected relation, an output signal will be generated over line 34 to divider 202, and pulse counter 46. Divider 202 is set to have a preselected ratio of input to output signals as discussed above. For example, if the ratio is 10 to one, then 10 input signals over line 34 are required before a single output signal is generated over line 40. The output signal over line 34 to pulse counter 46 operates as described above to activate pulse counter 46 since current has been provided before the generation of a second clocking pulse from counter drive 52 over line 158 as described above, with reference to FIG. 7.

Output signals from dividers 200 and 202 and from input circuit 14 in FIG. 9, are communicated over line 40 to input circuit 204. The signals on line 40 are communicated to input signal 204 to act as inquiry signal in a logic circuit in input circuit 204. If first and second means for storing in input circuit 204 are in the first preselected relation indicating that no random input signal is currently being stored, an inquiry signal is generated from input circuit 204 over line 216 to input circuit 206. If input circuit 206 is also in the first preselected relation indicating that it too is not storing a random input, an inquiry signal is generated over line 222 to output switch 42.

In the event that one of the input circuits 204 or 206 is storing a random input pulse and therefore is in its second preselected relation, that input circuit fails to generate an inquiry signal but instead generates an output signal to a respective pulse counter. For example, if input circuit 204 is in the second preselected relation, no inquiry signal is generated over line 216 to input circuit 206 but rather an output signal is generated over line 212 to pulse counter 214. Pulse counters 214 and 220 operate substantially the same as pulse counters 44, 46 and 48 discussed above with respect to FIG. 1.

It may therefore be seen that an inquiry signal over line 222 is only generated in the event that no random input signal is currently being stored in any of the input circuits connected to subtract random input signals from the totalizer output. Input circuits 204 and 206 may therefore be considered to be "negatively connected" whereas input circuits 10, 12 and 14 may be considered to be "positively connected". In FIG. 9, the only negatively connected input circuits illustrated are circuits 204 and 206, however, any number of input circuits may be connected similar to input circuits 204 and 206 so that in the event no random input signals are being stored in any of the negatively connected input circuits, inquiry signals are generated from a preceding input circuit to a succeeding input circuit until ultimately an inquiry signal is generated over line 222 to output switch 42, which acts to operate output switch 42 as discussed above and provide a signal to a recording and/or counting means connected to output switch 42 but not shown in FIG. 9.

In short, the embodiment of the present invention disclosed in FIG. 9 operates such that an input signal is applied to output switch 42 from positively connected input circuits 10, 12 and 14 only upon the condition that no negatively connected input circuits, such as circuits 204 or 206, are storing a random input signal. The embodiment in FIG. 9, however, does not provide a means for actually totalizing or counting output signals from the negatively connected input circuits 204 and 206. In some operations such an accounting is desired.

Figure 10:
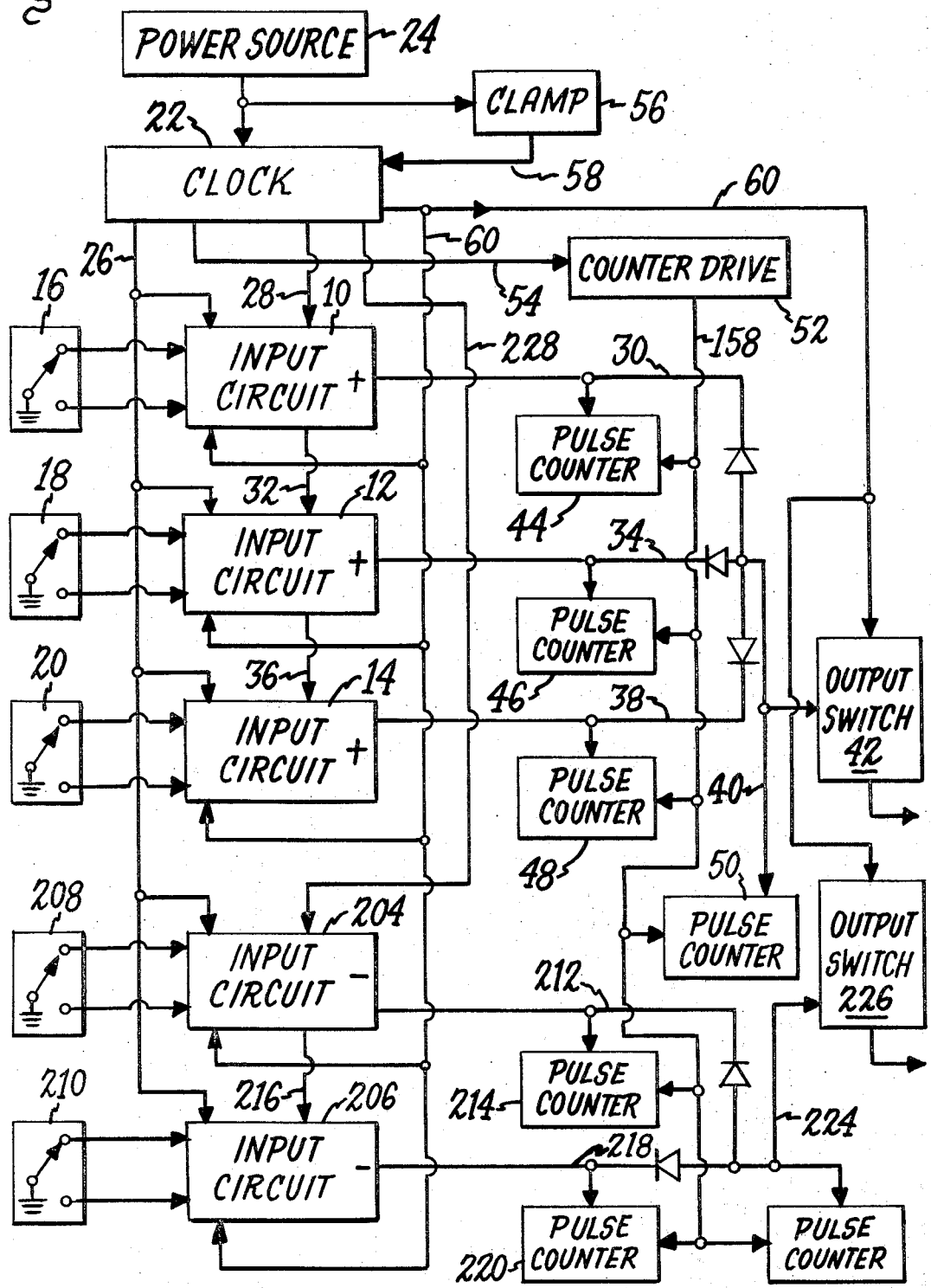

The embodiment of the present invention disclosed in FIG. 10 provides a means for totalizing or recording output signals from both positively and negatively connected input circuits. In FIG. 10, components substantially identical to components in FIGS. 1 and 9 are indicated by the same reference numerals. For example, positively connected input circuits 10, 12 and 14; negatively connected input circuits 204 and 206; clock 22; power source 24; output switch 42; and clamp 56 are all substantially the same as similarly referenced components in FIGS. 1 and 9.

In FIG. 10, no dividers are disclosed connected to outputs of any of the input circuits, however, it is to be understood that dividers such as dividers 200 and 202 in FIG. 9 may be connected to the outputs of any of the input circuits 10, 12, 14, 204 or 206 disclosed in FIG. 10. Since no dividers are employed, lines 30, 34 and 38 from respective input circuits 10, 12 and 14 are connected together to line 40 and line 40 is connected to output switch 42 substantially as shown in FIG. 1. The outputs from negatively connected input circuits 204 and 206 are communicated over respective lines 212 and 218 to line 224 which in turn is connected to the input of an output switch 226. Output switch 226 is identical in circuitry and function to output switch 42, in this embodiment of the invention. Pulse counters 214 and 220 are also connected to respective lines 212 and 128 as disclosed in FIG. 9. Third clocking pulses which are described below are communicated from clock 22 over line 228 to input circuit 204.

In operation, a reset signal is first generated over line 60 from clock 22 to reset positive connected input circuits 10, 12 and 14, negatively connected input circuits 204 and 206, and output switches 42 and 226 in a manner substantially the same as that discussed above with respect to FIGS. 1 and 9. Following the first reset pulse, clock 22 generates first clocking pules over line 26 for initially setting input circuits 10, 12, 14, 204 and 206 as described above.

Positive connected input circuits 10, 12 and 14; pulse counters 44, 46 and 48; and output switch 42 operate substantially the same as the similarly numbered components in FIG. 1. When a second clocking signal is generated over line 28 from clock 22 to input circuit 10, an output signal is generated over line 30 to output switch 42 if input circuit 10 is in a second preselected relation indicating that a random signal is currently being stored. In the event, no random signal is currently being stored, an inquiry signal is generated over line 32 to input circuit 12. This process continues through the remaining positively connected input circuits until each of them have received an inquiry signal or in the alternative, one of the input circuits is found to be storing a random signal and consequently an output signal is generated to output switch 42.

In the embodiment in FIG. 10, clock 22 also generates a third clocking pulse over line 228 to input circuit 204. The third clocking pulse operates in substantially the same manner as the second clocking pulse in that the third clocking pulse activates a logic circuit in input circuit 204, causing input circuit 204 to generate an output signal over line 212 if first and second means for storing in input circuit 204 are in the second preselected relation indicating that a random input signal is currently being stored. In the alternative, upon receipt of a third clocking pulse over line 228, input circuit 204 will generate an inquiry signal over line 216 if first and second means for storing in input circuit 204 are in the first preselected relation indicating that a random input signal is not currently being stored. The inquiry signal from input circuit 204 is transmitted on line 216 to a succeeding negatively connected input circuit 206. In response to the inquiry signal over line 216, input circuit 206 generates an output signal over line 218 if first and second means for storing an input circuit 206 are in the second preselected relation.

Output signals from negatively connected input circuits 204 and 206 are communicated over line 224 to the second output means, i.e. output switch 226. In addition, output signals from input circuit 204 over line 212 are connected to activate pulse counter 214 whereas output signals from input circuit 206 over line 218 activate pulse counter 220.

In situations where output switches 42 and 226 are connected to respective recording and/or counting devices, the timing of second and third clocking pulses from clock 22 is not critical provided they both follow first clocking pulses and provided they both occur during a time when counter drive 52 is activated. For example, in such a situation, second and third clocking pulses over lines 28 and 228 respectively may occur at precisely the same moment. Indeed, the second clocking pulse on line 28 might also be used as a third clocking pulse over line 228. However, in some situations output switches 42 and 226 are interconnected so that output signals from negatively connected input circuits are subtracted from output signals from positively connected input circuits. With such a connection, it becomes desirable to generate a third clocking pulse slightly before a second clocking pulse is generated over line 28. In the alternative, if the signals from output switch 42 are subtracted from the signals from output switch 226, it becomes desirable to have the third clocking pulses generated after generation of the second clocking pulses over line 28. In any case, it is necessary to assure that the control signals from clock 22 over line 54 are generated a time sufficiently before generation of either second or third clocking pulses so that counter drive 52 may operate to provide drive current over line 158 to all pulse counters employed.

The embodimnet in FIG. 10 shows the employment of two negatively connected input circuits 204 and 206, however, any number of input circuits may be employed as is apparent to those skilled in the art.

It will be understood that various changes may be made in detail within the scope of my claims without departing from the spirit of my invention. It is therefore to be understood that my invention is not to be limited to the specific details shown and described, but rather the true scope of the invention is defined by the following claims.

What is claimed as new and desired to be secured by Letters Patent of the United States is:

1. A solid state totalizer for totalizing a plurality of random input signals comprising:
   a. a clock for periodically generating time separated first and second clocking pulses;
   b. a plurality of input circuits each comprising:
      i. first and second storage means each having a plurality of stable states; said first storage means including:
         a. means communicating with said clock to receive from it said first clocking pulses, and
         b. means for receiving a random input signal, said first storage means being operable, in response to receiving one of said first clocking pulses, to achieve a stable state corresponding to said random input signal when the states of said first and second storage means are in a first preselected relationship;
      ii. a logic circuit comprising; means responsive to activation of the logic circuit for generating an inquiry signal in the event the states of said first and second storage means are in said first preselected relationship, and means for generating an output signal in the event the states of said first and second storage means are in a second preselected relationship;

iii. means for communicating said output signal to said second storage means, said second storage means being operable, responsive to receipt of said output signal, to assume said first preselected relationship by changing the state of said second storage means;

c. means for communicating said second clocking pulses from said clock to a selected one of said input circuits to activate the logic circuit in said selected input circuit;

d. means for connecting said input circuits in serial relationship to provide for transmission of an inquiry signal from each input circuit, starting with said selected input circuit, to an input circuit next in said serial relationship thereby to enable each said inquiry signal to activate the logic circuit in the next sequentially connected input circuit; and e. output means connected to each of said input circuits to receive said output signals from each of said input circuits.

2. The totalizer claimed in claim 1 including: at least one means for dividing that is operatively connected between a selected means for generating an output signal and said output means.

3. A totalizer as defined in claim 1 wherein each of said first and second clocking pulses are separated by a preselected time interval.

4. A totalizer as defined by claim 3 including a plurality of random signal generating devices, respectively, connected to said input circuits, each of said random signal generating devices having a signal generating rate that is substantially slower than the rate of generation of said first clocking pulses.

5. A totalizer as defined in claim 3 wherein said means for receiving a random input signal includes a staging circuit comprising:

a. a pair of input terminals for alternately receiving a random input signal, b. a pair of output terminals, c. first and second NAND gates, d. a source of electrical potential, e. a voltage dividing network comprising a first pair of impedances connected in series between said source of potential and the first input terminal, and a second pair of impedances connected in series between said source of potential and the second input terminal, f. the junction connecting said first pair of impedances being connected to a first input of the first NAND gate, g. the junction of the second pair of impedances being connected to a first input of the second NAND gate, h. circuit means connecting one of said output terminals to the output of the first NAND gate and to the second input of the second NAND gate, and, i. further circuit means connecting the other output terminal to the output of the second NAND gate and to the second input of the first NAND gate.

6. A solid state totalizer for totalizing a plurality of random input signals comprising:

a. a clock for periodically generating time separated first and second clocking pulses;

b. first and second pluralities of input circuits with each input circuit comprising:

i. first and second storage means each having a plurality of stable states; said first storage means including:

a. means communicating with said clock to receive from it said first clocking pulses; and b. means for receiving a random input signal; said first storage means being operable, in response to receiving said first clocking pulses, to achieve a stable state corresponding to said random input signal when the states of said first and second storage means are in a first preselected relationship;

ii. a logic circuit comprising means responsive to activation of the logic circuit for generating an inquiry signal in the event the states of said first and second storage means are in said first preselected relationship, and means for generating an output signal in the event the states of said first and second storage means are in a second preselected relationship;

iii. means for communicating said output signal to said second storage means; said second storage means being operable, responsive to receipt of said output signal, to assume said first preselected relationship by changing the state of said second storage means;

c. means for communicating said second clocking pulses from said clock to a first selected one of said input circuits in said first plurality of input circuits, thereby to activate the logic circuit in said first selected input circuit;

d. means for connecting said first plurality of input circuits in a first serial relationship to provide for transmission of an inquiry signal from each input circuit in said first plurality, starting with said first selected input circuit, to an input circuit next in said first serial relationship thereby to enable each said inquiry signal to activate the logic circuit in the next sequentially connected input circuit of said first plurality of input circuits; and e. first output means connected to receive first output signals from each of said input circuits in said first plurality of input circuits and further connected to communicate said first output signals as inquiry signals, to a second selected input circuit in said second plurality of input circuits, thereby to activate the logic circuit in said second selected input circuit; and f. means for connecting said second plurality of input circuits in a second serial relationship to provide for transmission of an inquiry signal from each input circuit in said second plurality, starting with said second selected input circuit, to an input circuit next in said second serial relationship thereby to enable each said inquiry signal to activate the logic circuit in the next sequentially connected input circuit of said second plurality of input circuits.

7. The totalizer claimed in claim 6 including second output means connected to the last serial input circuit in said second plurality of input circuits to receive an inquiry signal, as an output signal, from said last input circuit.

8. A solid state totalizer for totalizing a plurality of random relatively positive and negative input signals comprising:
  a. a clock for periodically generating first and second and third clocking pulses, at least said first and second clocking pulses being separated by a preselected interval;
  b. first and second pluralities of input circuits with each input circuit comprising:
   i. first and second storage means each having a plurality of stable states; said first storage means including:
     a. means communicating with said clock to receive from it said first clocking pulses, and
     b. means for receiving a random input signal; said first storage means being operable, in response to receiving said first clocking pulses, to achieve a stable state corresponding to said random input signal when the states of said first and second storage means are in a first preselected relationship;
   ii. a logic circuit comprising means responsive to activation of the logic circuit for generating an inquiry signal in the event the states of said first and second storage means are in said first preselected relationship, and means for generating an output signal in the event the states of said first and second storage means are in a second preselected relationship;
   iii. means for communicating said output signal to said second storage means, said second storage means being operable, responsive to receipt of said output signal, to assume said first preselected relationship by changing the state of said second storage means;
  c. means for communicating said second clocking pulses from said clock to a first selected one of said input circuits in said first plurality of input circuits, thereby to activate the logic circuit in said first selected input circuit;
  d. means for connecting said first plurality of input circuits in a first serial relationship to provide for transmission of an inquiry signal from each input circuit in said first plurality, starting with said first selected input circuit, to an input circuit next in said first serial relationship thereby to enable each said inquiry signal to activate the logic circuit in the next sequentially connected input circuit of said first plurality of input circuits;
  e. first output means connected to receive output signals from each of said input circuits in said first plurality of input circuits;
  f. means for communicating said third clocking pulses from said clock to a second selected one of said input circuits in said second plurality thereby to activate the logic circuit in said second selected input circuit;
  g. means for connecting said second plurality of input circuits in a second serial relationship to provide for transmission of an inquiry signal from each input circuit in said second plurality, starting with said second selected input circuit, to an input circuit next in said second serial relationship thereby to enable each said inquiry signal to activate the logic circuit in the next sequentially connected input circuit of said second plurality of input circuits; and
  h. second output means connected to receive said output signals from each of said input circuits in said second plurality of input circuits.

9. A totalizer as defined in claim 8 including a first and a second counting device, said first counting device being connected to receive an output signal from the first output means, and said second counting device being connected to receive an output signal from the second output means, said second and third clocking pulses being generated at substantially the same time.

10. A totalizer as defined in claim 9 wherein said second and third clocking pulses are generated on a common output terminal of said clock.

11. A totalizer as defined in claim 8 wherein each of said third clocking pulses are generated, respectively, slightly before each of said second clocking pulses.

12. A solid state pulse counter and driving circuit arrangement comprising:
  a. an input line (54) for receiving a drive signal,
  b. a counter drive circuit (52) that is operable to provide a pulsed output,
  c. a drive output line (158) for receiving a pulsed output from said counter drive circuit,
  d. a plurality of pulse counter circuits (e.g. 44 and 46), electrically connected in parallel to said output line,
  e. a plurality of input circuits (e.g. 10 and 12) each electrically connected, respectively, to one of said pulse counter circuits to transmit signals thereto,
  f. each of said pulse counter circuits being operable to count a signal transmitted to it from one of said input circuits in response to a pulsed output being provided to the drive output line, whereby said counter circuits are driven by the counter drive circuit on a time sharing basis.

13. An invention as defined in claim 12 wherein each of said pulse counter circuits includes a semi-conductor switch that is connected to be driven by pulsed outputs provided to the drive output line (158), and to be gated on by pulses transmitted to it from one of said input circuits.

* * * * *

UNITED STATES PATENT OFFICE
CERTIFICATE OF CORRECTION

Patent No. 3,812,385      Dated May 21, 1974

Inventor(s) Richard G. Farnsworth

It is certified that error appears in the above-identified patent and that said Letters Patent are hereby corrected as shown below:

Col. 2, lines 44 & 45 - "PRE-SELECRED" IS MISSPELLED, IT SHOULD BE -- PRE-SELECTED --;

Col. 7, line 15 - "94" SHOULD BE -- 97 --;

Col. 8, line 29 - "9$" SHOULD BE -- 94 --;

Col. 12, line 29 - "OUTPUTS" SHOULD BE -- OUTPUT --;

Col. 13, line 24 - "ONLINE" SHOULD BE -- ON LINE --;

Col. 18, line 35 - "EMBODIMNET" IS MISSPELLED, IT SHOULD BE --EMBODIMENT --.

Signed and sealed this 3rd day of December 1974.

(SEAL)
Attest:

McCOY M. GIBSON JR.
Attesting Officer

C. MARSHALL DANN
Commissioner of Patents

Attorney, Reg. #24748

September 18, 1974